United States Patent [19]

Cornwall et al.

[11] Patent Number: 5,130,641
[45] Date of Patent: Jul. 14, 1992

[54] EDDY WHEEL EDGE SENSOR

[75] Inventors: Mark K. Cornwall; Karen M. Owens; Keith Grateful, all of Spokane, Wash.; John E. Buffington, Post Falls, Id.

[73] Assignee: AMRplus Partners, Spokane, Wash.

[21] Appl. No.: 621,397

[22] Filed: Nov. 29, 1990

[51] Int. Cl.⁵ .................. G01R 11/02; G06F 15/20
[52] U.S. Cl. ..................... 324/96; 324/142; 324/137; 324/157; 324/175; 250/231.18; 250/231.17
[58] Field of Search ............... 324/175, 96, 142, 156, 324/157, 137, 74, 160, 166; 250/231.18, 231.17, 239; 340/870.01, 870.02, 870.18, 870.19; 364/481, 483; 235/95 R, 103

[56] References Cited

U.S. PATENT DOCUMENTS

| | | | |
|---|---|---|---|
| 3,127,594 | 3/1964 | Roe et al. | 340/870.29 |
| 4,321,531 | 3/1982 | Marshall | 324/142 |
| 4,327,362 | 4/1982 | Hoss | 340/870.02 |
| 4,604,725 | 8/1986 | Davies et al. | 250/231.18 |
| 4,660,036 | 4/1987 | Mosier | 340/870.29 |
| 4,713,610 | 12/1987 | Willis | 250/231.17 |
| 4,792,677 | 12/1988 | Edwards et al. | 340/870.29 |
| 4,956,551 | 9/1990 | Repachlager et al. | 250/231.17 |

*Primary Examiner*—Vinh Nguyen
*Attorney, Agent, or Firm*—Townsend and Townsend

[57] ABSTRACT

A sensor for detecting the rotation of an eddy wheel in an electric power meter is described. The sensor includes a pair of light sources arranged to focus light on the edge of the wheel, and a light detector arranged to sense reflections from the edge of the wheel caused by the light from the light sources. The light from either sensor is sufficient to trigger the detector, thereby requiring a sufficiently large interruption in the reflection, for example as caused by a mark on the edge of the eddy wheel, to interrupt the detector output. A filter is described for eliminating jitter in rotation of the eddy wheel.

11 Claims, 2 Drawing Sheets

EDDY WHEEL EDGE SENSOR

BACKGROUND OF THE INVENTION

This invention relates to sensors for detecting the motion of eddy wheels in electric power meters, and in particular to a dual-emitter single detector sensor with a digital filter.

One of the most widespread techniques for measuring the electric power supplied to homes and businesses is the use of an electric meter employing an eddy wheel. Meters employing this technology are commonly termed watt-hour meters.

A type of watt-hour meter in common use for the measurement of alternating current is an induction meter. An induction includes two electromagnets with the coil of one being energized by the current consumed, and with the coil of the other connected to the consumer voltage. Because the current and voltage in the consumer circuit are in phase with each other, the current in the voltage coil and therefore the magnetic field of that coil will lag 90° in relation to that of the current coil. The result of the interaction of the two coils produces a moving magnetic field which induces eddy currents in a light rotor disk. These currents cause the disk to rotate in the direction of motion of the moving field. The speed of rotation of the disk is thus proportional to the strengths of the two magnetic fields, and therefore the number of rotations of the eddy wheel is proportional to the power consumed. A small braking magnet is typically employed in such meters to constantly produce eddy currents in the rotor. These currents damp the rotation and assure that the rotor stops when no power is being consumed.

Meters employing this technology are in widespread use in the U.S. and abroad, with literally millions sold. Such meters are commonly read by a human observer noting the position of a series of counting wheels on the face of the meter and then supplying that information to the utility system which provides the power. The difference in count between two periods indicates the power consumed, and therefore enables the utility company to generate an appropriate bill for the installation at which the meter is situated.

Because of the inaccessibility of some power meters, and because of a desire to minimize the labor intensive practice of manual reading of the meters, various automatic meter reading systems have been developed. Such systems remotely detect the meter count and using that information enable utilities to generate billing information without personal observation of the meter dials. Furthermore, an increasingly common practice is demand metering in which the charge for electric power consumed varies according to time of day, season, or other factors. For such demand metering or remote meter reading, it is essential that the meter values be determinable at arbitrary, possibly frequent intervals. Of course, such demand essentially eliminates the ability of a human observer to detect the position of the meter dials, necessitating remote reading of the meter.

Another increasingly common practice is load shedding. In load shedding, consumers pay varying rates for electricity being supplied with an understanding that the utility may restrict the amount of power available or even disconnect power during peak demand periods. These practices also necessitate the remote reading of meters.

As a result, it is increasingly desirable to be able to detect remotely the amount of power consumed at relatively frequent and possibly short intervals. This need has led to the development of meters which supply information remotely using a variety of techniques. The use of such meters, however, presents an enormous cost to a utility which, to employ such meters, must replace existing meters. Accordingly, a need exists for the development of "retrofit" apparatus for mounting on existing watt-hour meters to detect at the meter the power consumption at intervals as frequently as desired.

SUMMARY OF THE INVENTION

We have developed a sensor for a watt-hour meter which detects rotation of the eddy wheel and supplies that information to desired electronic circuitry for transmission to utility company headquarters, or other locations. Our sensor relies upon the presence of an indicia, typically a dark marking, present on the edge of the eddy wheel. Our sensor is highly compact enabling it to fit within existing housings of watt-hour meters without modification. In addition, the sensor is relatively inexpensive, permitting it to be used in existing meters at a low cost.

In a preferred embodiment a sensor for detecting the rotation of an eddy wheel according to our invention includes a sensor body, a slot which extends into the body and has dimensions which are slightly greater than the thickness of the wheel. To designate the nature of the eddy wheel, and to illustrate the applicability of our invention to other types of meters, we frequently refer to the eddy wheel as a disk herein.

An opening is made in the sensor body extending from the slot at an off-angle to the plane of rotation of the disk. Another opening is made at another portion of the sensor body extending toward the slot at another angle from the slot. A light-emitting element is positioned in one opening and a light-detecting element in the other. By appropriate positioning of the openings the light emitted from the light-emitting element will strike the edge of the eddy wheel and reflect into the opening within which the detector is positioned. The passage of the mark on the edge of the eddy wheel will interrupt the reflection of light from the emitter to the detector, enabling well-known circuitry coupled to the detector to generate a pulse. This pulse, indicative of rotation of the disk, may be supplied to an external counter or the like. By suitable physical arrangement of the openings for the emitter and detector, ambient light is essentially precluded from striking the detector preventing false readings even under bright ambient conditions.

One prior art technique for reading the rotation of disks in utility meters was to orient a detector and an emitter below the rotating wheel and focus them on the surface of the wheel periodically interrupted by the motion of a mark or other indicia. Unfortunately, such detectors are unduly sensitive to changes in ambient light, thereby creating false readings.

DESCRIPTION OF THE SPECIFIC EMBODIMENT

Figure 1:
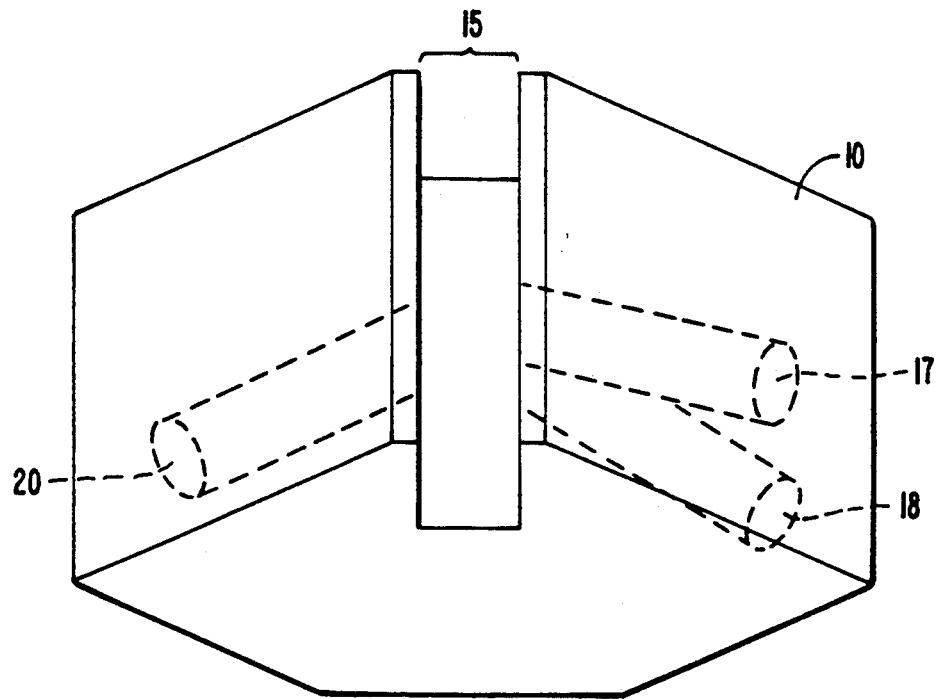
FIG. 1 is a perspective view of a preferred embodiment of the sensor structure.

FIG. 1 is a perspective view of a preferred embodiment of a sensor for detecting the rotation of a disk of selected thickness. The structure shown in FIG. 1 includes a sensor body 10 of generally arbitrary shape. For the embodiment depicted the body has essentially a pentagonal prismatic shape. The body includes a slot 15 extending inward from one of its surfaces. While this slot will be discussed in further detail, the purpose of slot 15 is to fit closely around the edge of the rotating disk whose rotation is to be detected. While the width and depth of the slot therefore will depend upon the dimensions of the disk, in the preferred embodiment where the rotation of an eddy wheel in an electric power meter is to be measured, the slot will have a depth of about 0.332 inches and a width of about 0.165 inches. The relatively close tolerance between the slot and the eddy wheel help prevent ambient light from reaching the sensor and generating false readings. Although the invention is described herein in the context of detecting the rotation of an eddy wheel in an electric power meter, it should be understood that the invention could equally apply to detecting the motion of rotating wheels in water or gas meters.

Sensor body 10 also includes a series of openings where light-emitting devices and light-detecting devices may be situated. For the embodiment depicted in FIG. 1 a pair of generally cylindrical openings 17, 18 extend from an outer surface of the body 10 to the slot. Another opening 20 extends from the slot to an exterior surface of the sensor body 10 on the other side of the slot. In the preferred embodiment the angle between the axis of slot 18 and slot 20 is approximately 90°, while the angle between the axis of opening 17 and opening 20 is also approximately 90°. In the preferred embodiment the angle between the axis of opening 17 and the axis of opening 18 is about 30°.

In operation, light-emitting devices, for example light-emitting diodes or other similar apparatus, are disposed in openings 17 or 18, while a light-detecting device, for example, a phototransistor, is disposed in opening 20. As the eddy wheel rotates a mark on its periphery will pass through the slot and change the reflection of light from the light-emitting devices in openings 17 and 18 to the light-detecting device situated in opening 20. Each time this change in reflection occurs, an output signal will be supplied from the detector in opening 20 to well-known associated circuitry for counting pulses from such a detector.

By using two light emitters and two separate slots, the devices are made much less sensitive to the regular markings on the periphery of the eddy wheel. In particular, the circuitry associated with the rotation detector is controlled in a manner such that a pulse will not be counted unless the reflection from both light sources in openings 17 and 18 is changed by the presence of the mark of the periphery of the eddy wheel. In other words, if light from either opening 17, 18 strikes the detector, it is assumed that no mark is present. In this manner, dirt or other small irregularities in the wheel do not affect the count.

It should be noted that the eddy wheels in conventional power meters are typically marked with a suitably wide black band on their edge, however, for meters where the mark is not present, it may be readily applied using any well-known coloring material.

Figure 2:
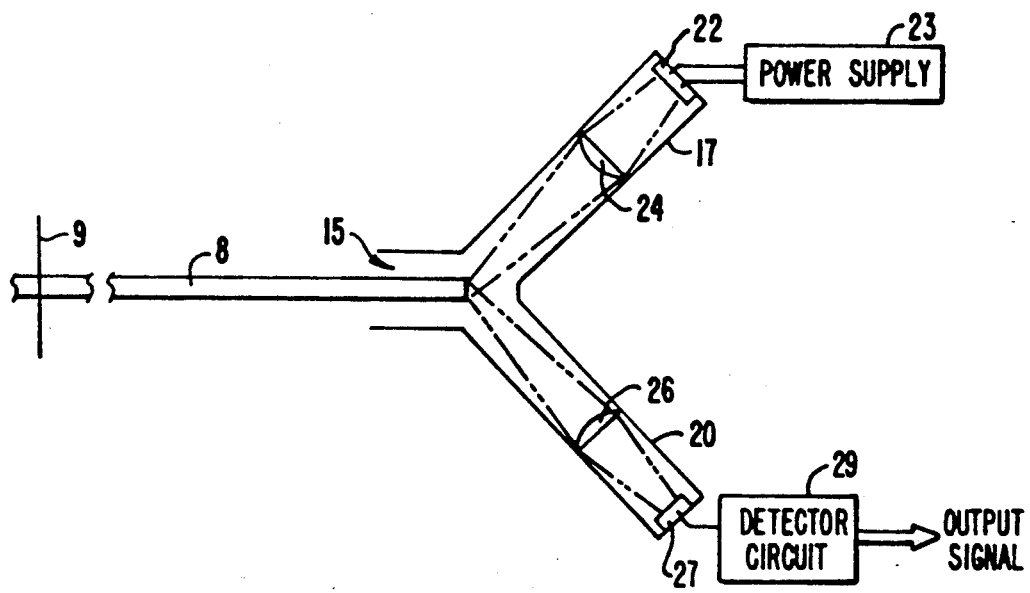
FIG. 2 is a cross-sectional view of the structure shown in FIG. 1.

FIG. 2 is a diagram illustrating the principle of operation of the apparatus shown in FIG. 1. In FIG. 2 the eddy wheel is designated 8, and is shown in cross-section, in other words, with the axis of rotation 9 being vertical in the figure. The openings for the light-emitting device 17 and light-detecting device 20 are shown. Within opening 17 a light-emitting device 22 is positioned and coupled to a power supply or other source of electrical energy 23. Light from emitting device 22 passes through lens 24 where it is focused on the edge of eddy wheel 8. As a result, it is reflected down opening 20 through lens 26 and received by detector device 27. Detector device 27 is electrically connected to a suitable detector circuit 29. In a preferred embodiment, the detector circuit 27 consists of a pulse-counting circuit connected to the output leads of a phototransistor, although charge-coupled devices or other well known apparatus may also be employed.

As briefly explained above, during most of the rotation of the eddy wheel, the light reflected from the edge of the wheel 8 changes only slightly, resulting in a continuous signal being supplied to detector circuit 29. By convention this condition produces no pulses from detector circuit 29, i.e., a zero count. The presence of a dark band on the edge of the wheel 8, however, interrupts the reflection from the emitter 22 sufficiently to cause the photoresistor 27 not to supply a signal to detector circuit 29, thereby indicating the presence of the dark mark. In the preferred embodiment, because of the presence of two light sources, the detector circuit will only supply an output signal when the energy from both sources is essentially precluded from being reflected to phototransistor 27, thereby necessitating the presence of a relatively large dark mark on the edge of the wheel 8. When this occurs the detector circuit will supply a pulse which is interpreted as a "1" for the count.

Figure 3:
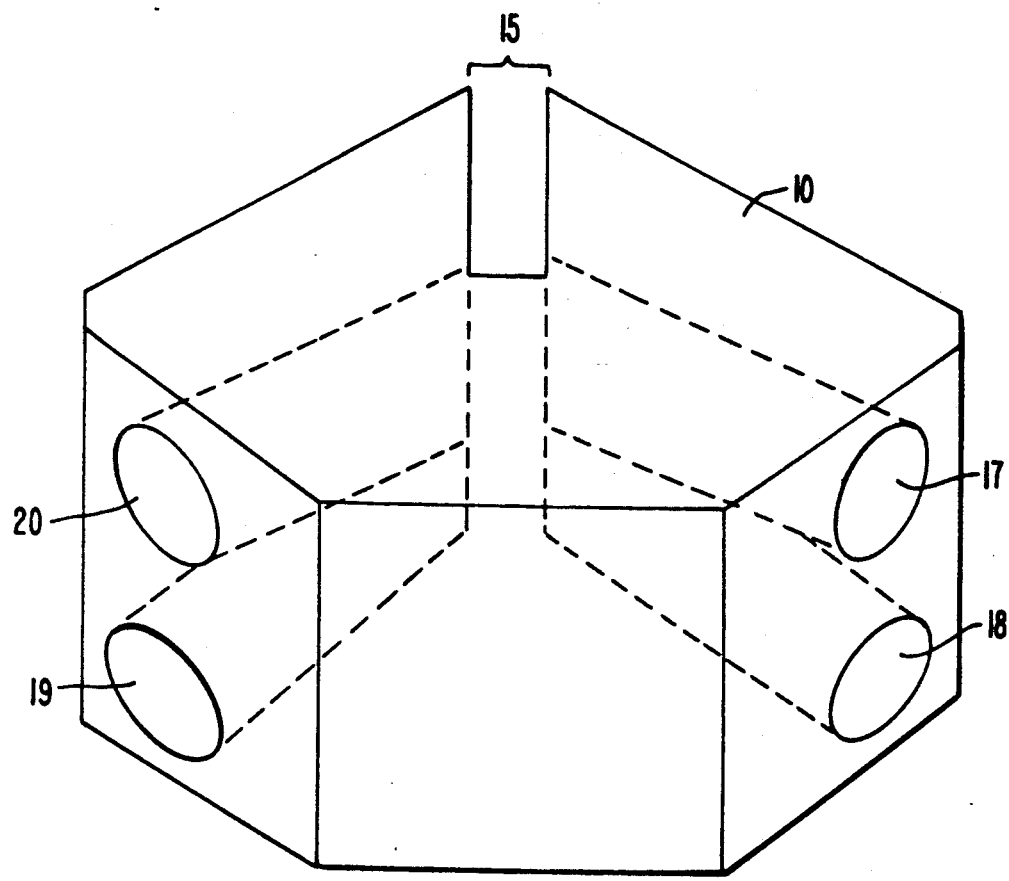
FIG. 3 is a perspective view of an alternative embodiment of the invention.

FIG. 3 is a perspective view of another embodiment of sensor body 10 including a slot 15. In this embodiment, however, two light-emitting openings 17 and 18 are provided, as are two light-detecting openings 19 and 20. Such an embodiment readily enables the sensor to detect the direction of rotation of the eddy wheel. This is achieved by detecting the timing relationship of output signals from phototransistors positioned in each of openings 19 and 20. As the dark band on the edge of the eddy wheel passes the two phototransistors, first one will be turned off, then both turned off, then the first turned on, then the second turned on, to thereby indicate the direction of rotation. Such an embodiment is particularly advantageous in applications where power can be both consumed and supplied.

In either the embodiments of FIGS. 1 or 3, by positioning the emitters and detectors off axis from the plane of the eddy wheel, the influence of outside light is minimized. The position of the emitter and detector, however, do not compensate for jitter from a slowly moving wheel. To eliminate false readings, where the wheel is moving sufficiently slowly that vibrations in the wheel may move the mark on the edge of the wheel back and forth across the field of view of the emitter or detector, a digital filtering algorithm is employed. The algorithm effectively sorts out multiple pulses caused by vibration of the wheel. The algorithm is based on the width of the mark and the maximum speed of the wheel, thereby eliminating changes in the output occurring faster than the maximum speed of the wheel.

In the preferred embodiment, the detector output is sampled ten times every millisecond and the presence of a silver or reflective edge is characterized as a zero and the interruption of reflection, in other words, the presence of a dark edge, is characterized as a one. An average number of pulses per millisecond is computed. After the last detection of a mark on the wheel, the average is set to zero. (The black mark is not counted until an average of "0" is continuous for a period of 64 msec. or an absolute minimum "silver" time period. This prevents wheel (disk) creepage back onto a black mark from being counted.)

Each millisecond a new average is computed, and an edge of the mark is not considered to be present until the average reaches a predetermined threshold, which in the preferred embodiment is nine. For example, assume that in the first millisecond a portion of the dark mark passes into view of the detector, and 8 counts are registered. During this millisecond the average is therefore 4, computed by summing the previous average of zero(no counts because reflection was present) plus the 8 counts received in the millisecond window. During the next millisecond 10 counts are received because the dark mark prevents reflection. Thus, the 10 counts added to the previous average of 4 with the sum divided by 2 results in an average of 7. During the next millisecond another 10 counts are received (dark mark is still in view) and the resulting average will be 8 computed by adding the previous average of 7 to the 10 counts received and dividing the sum of 17 by 2 (and discarding the remainder). Finally, during the next millisecond another 10 counts are received. The 10 plus the previous average of 8 result in a new average of 9. Because this average equals (or exceeds) the threshold of 9, the interruption in reflection is now characterized as the presence of a mark. The presence of a mark is considered to continue until the average drops below 9 again.

Although the invention has been described in the context of a black mark on the edge of a wheel, it should be appreciated that the emitter and detector apparatus described rely upon a difference in reflectivity between the edge of the wheel and the mark. Thus, any type of mark may be sensed, provided only that there is sufficient contrast between the mark and the unmarked portion of the disk edge.

In a preferred embodiment the light-emitting device consists of an infrared light-emitting diode and the light-sensing device is an infrared-sensitive phototransistor. The choice of wavelengths for the emitter and detector is somewhat arbitrary; however, the use of wavelengths outside the visible range will substantially reduce the sensitivity of the meter to variations in ambient light with time of day, time of year, and the reflectivity of the environment in which the meter is situated.

Figure 4:
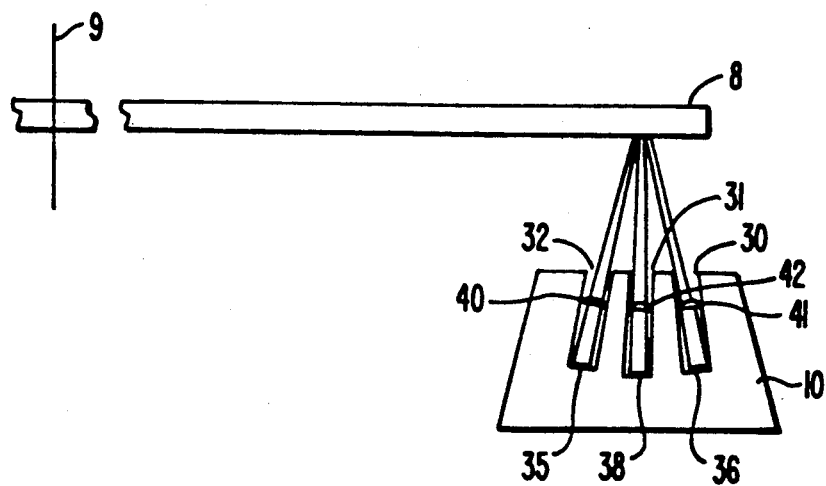
FIG. 4 is a diagram illustrating an on-axis embodiment of the invention.

FIG. 4 is a schematic diagram illustrating an on-axis sensor detector configuration. This configuration is suitable for use in applications where, instead of the edge of the disk being marked, a mark is present on the lower or upper surface of the rotating disk. The disk 8 rotates about axis 9, and as shown the sensor body 10 is positioned above or below the disk. The sensor body includes three openings 30, 31, 32. In two of the openings, light sources, for example light-emitting diodes 35, 36 are disposed. In the third opening a light detector 38 is disposed. The emitters 35, 36 and/or the lens system 40, 41 are disposed to cause the emitters to focus light in a selected region on the surface of the disk. In the same manner the detector 38 and its associated lens 42 are positioned to detect the presence or absence of light in the selected region on the disk. The light sources and the light detector are coupled to well known circuitry (not shown) as described above in conjunction with FIG. 2.

By positioning the light sources and light detector in the manner shown, the light from either source can be made sufficient to trigger the detector. In this manner, only a true mark on the wheel will be detected, not an aberration due to dust, dirt, or other imperfections on the surface of the wheel.

Although the foregoing description has been made of specific embodiments of the eddy wheel sensor, it should be understood that the sensor is equally applicable to other types of rotating disks in utility meters. For example, in certain water and gas meters, consumption of the fluid or gas measured is indicated by a rotating disk. The sensors described herein can be adapted to detect the rotation of disks in such meters. Thus, while a preferred embodiment of the invention has been illustrated, it should be understood that the scope of the invention is defined by the appended claims.

We claim:

1. A sensor for detecting the rotation of a disk in a utility meter, the disk of selected thickness rotating about an axis of rotation and having an indicia on its edge, the sensor comprising:

a sensor body;

a slot having an upper and a lower surface, the slot extending into the body and having a width grater than the thickness of the disk;

a first opening extending from the one of the upper and lower surfaces of the slot into the sensor body in a first direction not parallel to the axis of rotation of the disk;

a first light source disposed in the first opening and spaced from the disk; a second opening extending from the other of the upper and lower surfaces of the slot into the sensor body in a second direction not parallel to the axis of rotation of the disk, and not parallel to the first direction;

a first light detector disposed in the second opening and spaced from the disk; and whereby the sensor body is disposed in proximity to the disk with the edge of the disk extending into the slot, and light from the first light source striking the edge of the disk is detected by the first light detector.

2. A sensor as in claim 1 further comprising:

a third opening in the sensor body, the third opening extending from one of the upper and lower surfaces of the slot into the sensor body in a third direction not parallel to the axis of rotation of the disk;

a second light source disposed in the third opening and spaced from the disk;

whereby light from the second light source striking the edge of the disk is detected by the first light detector.

3. A sensor as in claim 2 wherein light from only one of the first and second light sources is sufficient to activate the first light detector.

4. A sensor as in claim 2 wherein:

the first and third openings are disposed in a portion of the sensor body so as to be on one side of the disk; and the second opening is disposed in a portion of the sensor body so as to be on the other side of the disk.

5. A sensor as in claim 4 wherein:
the first and the third direction are at a first angle with respect to the axis of rotation; and
the second direction is at a second angle to the axis of rotation.

6. A sensor as in claim 5 wherein the sum of the first and the second angles is ninety degrees.

7. A sensor as in claim 5 further comprising:
a fourth opening in the sensor body, the fourth opening extending from one of the upper and lower surfaces of the slot into the sensor body in a fourth direction not parallel to the axis of rotation of the disk; and
a second light detector disposed in the fourth opening and spaced from the disk.

8. A sensor as in claim 2 wherein:
the second light source comprises an infrared source.

9. A sensor as in claim 1 wherein:
the first light source comprises an infrared source; and
the first light detector comprises an infrared detector.

10. A sensor as in claim 1 wherein the disk comprises an eddy wheel in an electric power meter.

11. A sensor for detecting the rotation of a disk in a utility meter, the disk of selected thickness rotating about an axis of rotation and having an indicia on its edge, the sensor comprising:
a sensor body;
a first opening extending into the sensor body;
a first light source disposed in the first opening spaced from the disk, the first light source aligned to strike a selected region on the disk;
a second opening extending into the sensor body;
a second light source disposed in the second opening spaced from the disk, and also aligned to strike the selected region on the disk;
a third opening extending into the sensor body;
a first light detector disposed in the third opening and spaced from the disk; and
whereby the sensor body is disposed in proximity to the disk so light from either one of the first and the second light sources striking the disk is detected by the first light detector.

* * * * *